United States Patent [19]

Knapp

[11] Patent Number: 5,096,328
[45] Date of Patent: Mar. 17, 1992

[54] FITTING FOR DISMOUNTABLE CONNECTION OF TWO CONSTRUCTION ELEMENTS

[75] Inventor: Friedrich Knapp, Amstetten, Austria

[73] Assignee: Friedrich Knapp Gesellschaft M.B.H., Amstetten, Austria

[21] Appl. No.: 471,035

[22] Filed: Jan. 26, 1990

Related U.S. Application Data

[63] Continuation of Ser. No. 133,031, filed as PCT/AT87/00009, Feb. 13, 1987, abandoned.

[30] Foreign Application Priority Data

Mar. 13, 1986 [AT] Austria ............... A 667/86

[51] Int. Cl.⁵ .............................. F16B 17/00
[52] U.S. Cl. .................... 403/340; 403/364
[58] Field of Search ............. 403/268, 339, 340, 402, 403/406.1, 407.1, DIG. 10, 12, 316, 364, 345, 353, 375; 52/281, 582, 583, 586

[56] References Cited

U.S. PATENT DOCUMENTS

| | | | |
|---|---|---|---|
| 1,368,191 | 2/1921 | Nelson | 403/340 X |
| 2,893,521 | 7/1959 | Austin | 403/340 X |
| 3,204,300 | 9/1965 | Hofmann | 403/364 X |
| 3,577,105 | 5/1971 | Jones, Sr. | 403/339 X |
| 4,034,512 | 7/1977 | Lindal | 52/582 X |

FOREIGN PATENT DOCUMENTS

| | | | |
|---|---|---|---|
| 373046 | 12/1983 | Australia . | |
| 1528345 | 9/1974 | Fed. Rep. of Germany . | |
| 2732334 | 1/1979 | Fed. Rep. of Germany | 403/339 |
| 2914345 | 10/1980 | Fed. Rep. of Germany . | |
| 2932469 | 1/1981 | Fed. Rep. of Germany . | |
| 2384150 | 10/1978 | France . | |
| 616993 | 4/1980 | Switzerland . | |
| 6244 | 5/1885 | United Kingdom | 403/339 |
| 137570 | 1/1920 | United Kingdom | 403/339 |
| 759545 | 10/1956 | United Kingdom . | |
| 2073840 | 10/1981 | United Kingdom | 403/339 |

Primary Examiner—Peter M. Cuomo
Attorney, Agent, or Firm—Spencer & Frank

[57] ABSTRACT

A fitting for the connection of construction elements, such as wooden construction elements. The fitting is made of two identical fish-belly shaped fitting components which insert into corresponding grooves in the construction elements. Each fitting element has harpoon-like webs to engage the construction elements. Opposite to the fish-belly portion of the fitting element is a blade and upon the blade is at least two hook heads spaced apart by at least the width of one hook head. In the connected position, the fitting components face each other and the two complementary fitting components grip one behind the other at the hook heads.

5 Claims, 2 Drawing Sheets

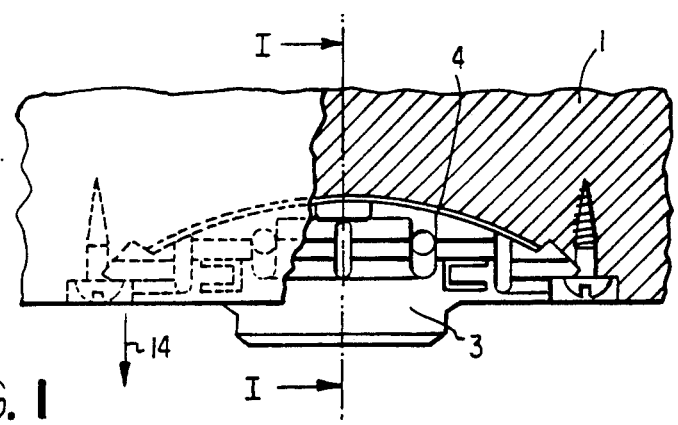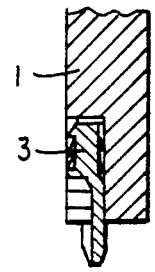
FIG. 1    FIG. 3
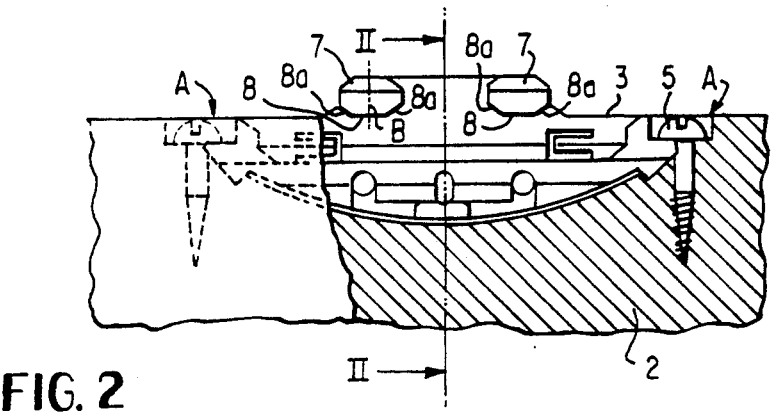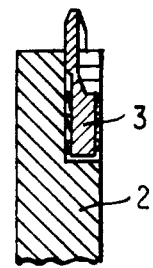
FIG. 2    FIG. 4
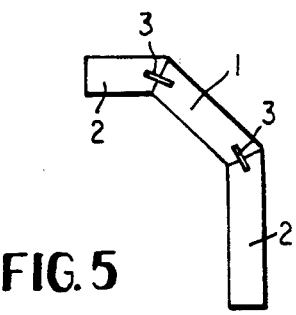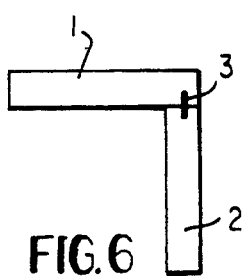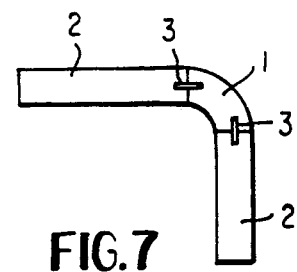
FIG. 5    FIG. 6    FIG. 7
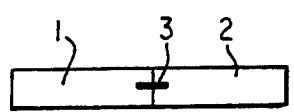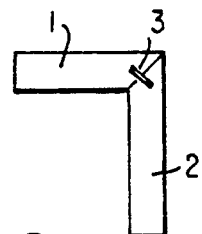
FIG. 8    FIG. 9

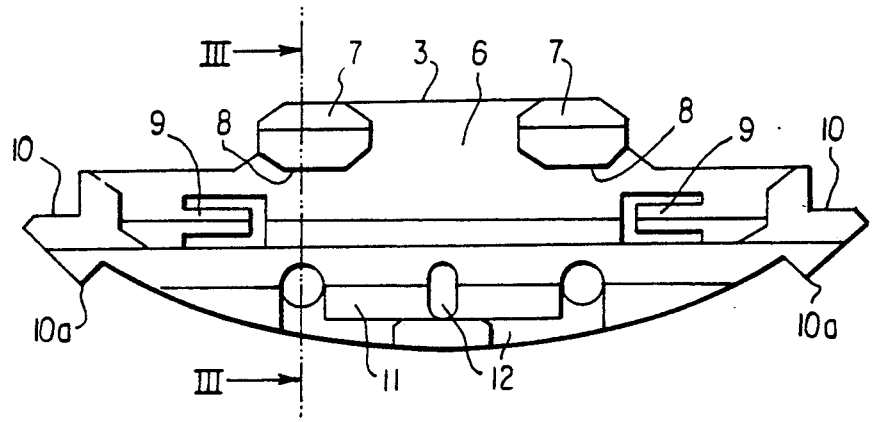
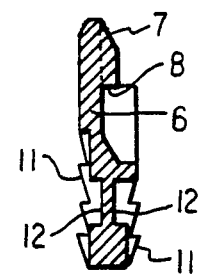
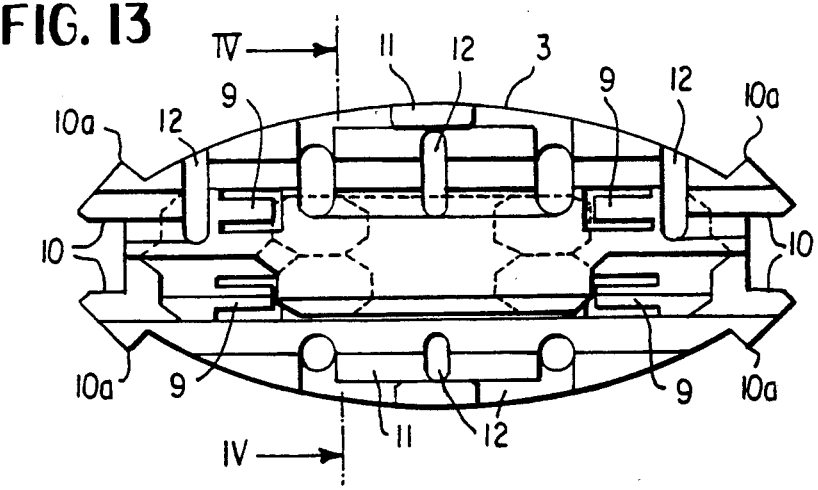
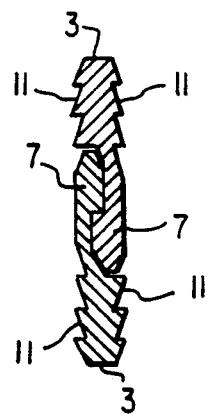

FITTING FOR DISMOUNTABLE CONNECTION OF TWO CONSTRUCTION ELEMENTS

This application is a continuation of application Ser. No. 07/133,031, filed as PCT/AT87/00009, Feb. 13, 1987, now abandoned.

BACKGROUND OF THE INVENTION

1. Field of the Invention

The invention relates to a fitting for the connection of two construction elements, particularly wooden elements, including two essentially fish-belly shaped fitting components insertable and fastenable in corresponding grooves of the construction elements, with the fitting elements being provided with harpoon-like webs at their side faces and with hook heads arranged to engage with one another and laterally projecting from blades which themselves are shaped on at sides of the fitting components that face one another during joining. In the connected position, the hook heads of the two interacting fitting components grip one behind the other.

2. Discussion of the Background

A fitting of this type is described in Austrian Patent No. 373,046. In this prior art fitting, a hook head is provided at each blade of the fitting components and the stability of the connection is limited by the holding force that can be realized with such a lateral or arrow-shaped hook head. Moreover, in this prior art fitting, the hook head is given rounded ends and this may create a point contact during joining of the fitting components which may cause high friction forces resulting in jamming phenomena when the fitting components are joined. Similar difficulties or drawbacks, respectively, may result in a fitting as disclosed in Swiss Patent No. 616,993 which differs from the abovementioned prior art fitting in that the hook heads extend essentially to one side along the surface plane of the fitting components, with each fitting component being equipped with one such hook head and, due to the fact that two identically configured fitting components are joined in a position where they are offset by 180° with respect to one another, the hook heads engage one another.

SUMMARY OF THE INVENTION

It is an object of the present invention to provide a fitting of the above-mentioned type in which the difficulties and drawbacks occurring in the prior art fittings of this type are overcome and the union of the fitting components is improved.

The fitting according to the invention of the type mentioned above is characterized in that each one of the two fitting components of the fitting has at least two hook heads at its blade, which hook heads are arranged laterally at a distance from one another corresponding at least to the length of one hook head and that the hook heads have a hooking face which ends in a slope on both sides. Due to the configuration of the fitting according to the invention, the above-mentioned object can be realized well and, in addition to an improved union of the fitting components when joined together, the greater width of the blade resulting from the provision of at least two hook heads at each blade also results in a greater overlap width or overlap area, respectively, of the two blades of a pair of interacting fitting components. Thus the two fitting components are also guided better during the joining process.

For accurate mutual positioning of two interacting fitting components, which together form a fitting, it is of advantage to provide flexible or movable locking tabs in the region immediately following the hook heads of the fitting components, when seen in the direction of joining of the two fitting components of a fitting, in which the hook heads of the other one of the two interacting fitting components come to lie, when the fitting is in the connected position. These locking tabs are laterally offset with respect to the hook heads and form a lateral abutment for the hook head of the respective other fitting component. If required, the abovementioned locking tabs may be bent outwardly or moved out of the surface of the fitting components so that then, if desired, the lateral displacement of the one fitting component to the one or the other side with respect to the other fitting component of a fitting can be limited. Generally, grooves are provided for insertion of the fitting components for attachment of the fitting components to the construction elements to be joined together. Advantageously, grooves may be provided whose bottom has a circular shape and is adapted to the outer contour of the fitting components. Such grooves can be produced with a router as it is widely used particularly by cabinet makers. The harpoon-like webs provided at the side faces of the fitting components provide a good support to the fitting components in such grooves. Generally, the anchorage of the fitting components in the grooves is enhanced by the introduction of glue or some other adhesive in the grooves. According to an advantageous feature of the fitting according to the invention, the anchorage is improved further in that steps are provided at the lateral ends of the fitting components at the side provided with the blade. Thus, the fitting components may additionally be fixed with screws which are screwed next to the fitting components at the ends of the latter into the components to be joined, with the undersides of the screw heads coming to lie against the above-mentioned steps of the fitting components. It is then of advantage for the installation of the fitting components if spikes are provided on the edge of the side of the fitting components facing away from the blade because, when the fitting components are inserted into the construction elements, these spikes very easily hold them in position to secure the placement of the fitting components in the construction elements until the screws and/or glue become fully effective.

BRIEF DESCRIPTION OF THE DRAWINGS

The invention will be described further below with reference to embodiments which are illustrated schematically in the drawing figures. The invention is not limited to the embodiments shown in the drawing.

The drawing figures show in:

FIGS. 1 and 2, two fitting components together forming an embodiment of a fitting according to the invention which is inserted into construction elements that are to be joined together, with FIG. 1 being a partially cut-away rear view and FIG. 2 a partially cut-away front view of the fitting components inserted into grooved panels.

FIG. 3 is a sectional view along line I—I of FIG. 1; and

FIG. 4 is a sectional view along line II—II of FIG. 2.

FIGS. 5 to 9 show various ways of attaching a fitting according to the invention for the case of panels which are joined by means of such a fitting, with these figures including partially cut-away side views, viewed toward the frontal face edges of the panels.

FIG. 10 is a front view of a fitting component according to the invention;

FIG. 11 is a sectional view of this fitting component along line III—III of FIG. 10; and FIG. 12 is a top view of this fitting component.

FIG. 13 shows a fitting configured according to the invention in which two identically configured fitting components are in a locked position hooked into one another;

FIG. 14 is a sectional view of this fitting along line IV—IV of FIG. 13.

DETAILED DESCRIPTION OF THE PREFERRED EMBODIMENTS

In the drawing figures, FIGS. 1 and 3 show a fitting component 3 inserted into a construction element 1 and FIGS. 2 and 4 show a fitting component 3 of the same configuration in a position turned by 180° and inserted into a second construction element 2. Approximately semicircular grooves are provided to receive fitting components 3 in construction elements 1 and 2. In the illustrated case, construction elements 1 and 2 are panels. One such a fitting component 3 is shown to a larger scale in FIGS. 10, 11 and 12 and FIGS. 13 and 14 show a fitting combined of two such fitting components.

Fitting components 3 are each provided with a blade 6 on which are disposed at least two protruding hook heads 7. The hook heads are here placed laterally next to one another at a distance which corresponds to at least the length of one hook head. Hook heads 7 have a hooking surface 8 which ends in a slope at both sides so that surface contact during joining of two fitting components, when the hook heads are brought into mutual engagement, produces easy displaceability at the sloped hooking surfaces. In the illustrated case, two hook heads are provided; but it is easily possible to provide a larger number of such hook heads, for example three or four, at each blade 6.

Thus, as seen in FIG. 2, the fitting component 3 has a base body 3a including a blade 6 on which spaced hook heads 7 are formed. Each hook head 7 is bounded by a hooking surface 8 having a length extending generally parallel to the front side A of the fitting components 3. The opposite ends of each hooking surface 8 are adjoined by a sloped planar surface 8a extending towards the front side A at an inclination to the respective hooking surface 8. On each hook head 7, the two sloped planar surface 8a are in mirror symmetry to one another as related to a plane B which intersects the length of the respective hooking surface 8 and is oriented perpendicularly to such length.

Fitting components 3 are provided with locking tabs 9 which, as shown in FIG. 12, can be bent out of blade 6 to produce an abutment for a hook head on a second fitting component cooperating with this fitting component. Seen in the direction of joining 14 of the two fitting components of a fitting, the locking tabs 9 are laterally offset with respect to hook heads 7 in the region immediately following hook heads 7 of fitting components 3 and thus form the abovementioned lateral abutments which cooperate with the hook heads and thus fix the mutual position of two fitting components 3 in the lateral direction.

On the side of the fitting components provided with the blade 6, the lateral ends of these fitting components 3 are provided with steps 10. The undersides of the heads of screws 5—in the case illustrated in FIGS. 1 to 4 round head screws—screwed into the components 1 and 2 to be joined together can lie against these steps. This ensures a particularly secure seat for the fitting components 3 in construction elements 1 and 2. Moreover, fitting components 3 are fixed in construction elements 1 and 2 by means of harpoon-like webs 11 and glue channels 12 provided in the lateral faces of fitting components 3, with webs 11 reinforcing, directly and in cooperation with glue introduced into grooves 4, the anchorage of the fitting components in the groove walls. Glue channels 12 produce or enhance, respectively, uniform distribution of the glue introduced into grooves 4 of construction elements 1 and 2 when the fitting components 3 are inserted. To fix the position of these construction elements as soon as fitting components 3 are inserted into construction elements 1 and 2 until the glue connection or screws 5 are able to provide firm support, spikes 10a may advantageously be provided on the side of the fitting components facing away from blade 6 along the edges of the fitting components as shown in the drawing figure in the region of steps 10. However, it is also possible to accomplish this without such spikes in which case, for example, the edge of fitting components 3 may be configured to continue in a circular arc through to the ends.

If desired, locking tabs 9 may also be configured so as to be movable.

FIGS. 5 to 9 illustrate various possibilities for the joining of construction elements 1 and 2 by means of fittings configured according to the invention in which both fitting components are inserted into one of the two construction elements to be connected and are joined together.

I claim:

1. A fitting for connecting two elements to one another; said fitting comprising two complementary fitting components affixable to the one and the other element; each said fitting component comprising a base body having a front side;

a blade formed on the base body; said blade having an upper face; and at least two hook heads formed on and projecting from said upper face; each of said hook heads having a length extending parallel to said upper face and parallel to said front side; said hook heads being spaced from one another generally parallel to said front side, at a distance corresponding at least to the hook head length; each said hook head being bounded by a hooking surface having a length extending generally parallel to said front side; each said hook head further being bounded by two sloped planar surfaces extending towards said front side from opposite ends of said hooking surface obliquely to the length of said hooking surface; said sloped planar surfaces being in mirror image symmetry with one another relative to a plane intersecting and being perpendicular to the length of said hooking surface, whereby during an interengaging relative motion between the two fitting components, the latter are guided towards one another by a sliding engagement of the sloped planar surfaces of one of the fitting components with the sloped planar surfaces of the other of the fitting components and wherein, in a fully interengaged state between the two fitting components, the hooking surfaces of the one fitting component are in an abutting, locking relationship with the hooking surfaces of the other fitting component.

2. A fitting component as defined in claim 1, further comprising at least one flexible or movable locking tab, each locking tab being disposed below and laterally offset from a hook head on the blade of each fitting component, thereby forming an abutment for a hook head of the other fitting component when the two fitting components are interconnected.

3. A fitting according to claim 1, wherein the base body of each fitting component has two opposite ends at said front side; further comprising a cutout step at each said end of said base body; each step being open towards said front side.

4. A fitting according to claim 1, wherein the base body of each fitting component has two opposite ends at said front side; further comprising a spike on the base body at each said end of said base body; each said spike being oriented away from said front side.

5. A fitting as defined in claim 1, further wherein said base body has opposite ends, further comprising a horizontal portion on each terminal end of the base body; a riser connected to and extending upwardly from each horizontal portion; and a horizontal surface interconnecting the two risers, whereby a receiving step is defined at each end of the base body for accommodating in a face-to-face engagement a head of a fastener situated in its entirety externally of the base body.

* * * * *